United States Patent [19]
Weiss et al.

[11] Patent Number: 5,455,472
[45] Date of Patent: Oct. 3, 1995

[54] MOMENT IMPARTING BEARINGS FOR CONTROLLING SHAFT DEFLECTION

[75] Inventors: Carl F. Weiss, West Palm Beach, Fla.;
David H. Hibner, Ashford, Conn.

[73] Assignee: United Technologies Corporation, Hartford, Conn.

[21] Appl. No.: 87,639

[22] Filed: Jul. 6, 1993

[51] Int. Cl.$^6$ ..................................................... H02K 7/09
[52] U.S. Cl. ..................... 310/90.5; 318/127; 324/207.12
[58] Field of Search ..................... 310/90.5; 324/207.11, 324/207.12, 207.24, 207.25; 318/127, 128, 615; 73/461

[56] References Cited

U.S. PATENT DOCUMENTS

| | | | |
|---|---|---|---|
| 3,845,997 | 11/1974 | Boden et al. | 310/90.5 |
| 3,877,761 | 4/1975 | Boden et al. | 310/90.5 |
| 4,866,318 | 9/1989 | Habermann et al. | 310/90.5 |
| 4,920,290 | 4/1990 | Murakami et al. | 310/90.5 |
| 4,999,534 | 3/1991 | Andrianos | 310/90.5 |
| 5,084,643 | 1/1992 | Chen | 310/90.5 |
| 5,216,308 | 6/1993 | Meeks | 310/90.5 |
| 5,247,219 | 9/1993 | Nakagawa et al. | 310/90.5 |
| 5,313,399 | 5/1994 | Beale | 364/463 |

*Primary Examiner*—Thomas M. Dougherty
*Assistant Examiner*—D. R. Haszko
*Attorney, Agent, or Firm*—Christopher T. Hayes

[57] ABSTRACT

A magnetic bearing assembly is disclosed which provides for correction of shaft deflection, or "bowing", during rotation of the shaft. The assembly comprises two stator rings in spaced relation to each other, and each stator ring comprises a plurality of stator sections which are independently activated. When the shaft "bows", sensors detect the deflection and independently activate the various stator sections producing a force couple which acts on the rotor to produce a bending moment in the shaft which tends to counteract the "bowing".

4 Claims, 8 Drawing Sheets

5,455,472

MOMENT IMPARTING BEARINGS FOR CONTROLLING SHAFT DEFLECTION

FIELD OF THE INVENTION

The present invention relates to rotary magnetic bearings and in particular to a magnetic bearing which introduces a bending moment normal to the axis of rotation of the rotor assembly.

BACKGROUND OF THE INVENTION

Large shaft driven machines, such as gas turbine engines used in aircraft applications, require radial bearings and thrust bearings to support and position the shafts thereof. A typical gas turbine engine may have two or three coaxial shafts nested within each other, resulting in a shaft support design which only permits the inner shaft to be supported at the ends thereof. Deflection of the shaft between the support bearings is inevitable due to the mass of the compressor and turbine rotors. If a shaft deflects significantly, or "bows" (i.e. the displacement of the shaft from the desired axis of rotation varies with the axial position along the shaft) wear or damage may occur to the engine components. This deflection is referred to in the art as the "first bending critical".

If the shaft of a gas turbine engine bows beyond allowable operating tolerances, the tips of the rotating blades may grind into the outer air seal, thereby wearing away both the seal and the tips of the blades and deteriorating overall operating efficiency of the engine. For land-based applications where weight is not a critical factor, the wall of the inner shaft can be increased as desired to ensure that the deflection is within tolerances at all anticipated operating conditions. However, for high performance aircraft, which are subjected to varying "G-forces" during flight maneuvers, it is imperative that the deflection be controlled while minimizing any increase in the weight of the shaft.

Magnetic bearings are an attractive option to the ball or roller bearings which are commonly used on aircraft gas turbine engines, due to the potentially frictionless support they provide. However, current magnetic bearings do not solve the shaft deflection problems discussed above.

What is needed is a magnetic bearing assembly which reduces the deflection, and hence the first bending critical, of a rotating shaft without significantly increasing the weight of the gas turbine engine.

DESCRIPTION OF THE PREFERRED EMBODIMENT OF THE INVENTION

Figure 1:
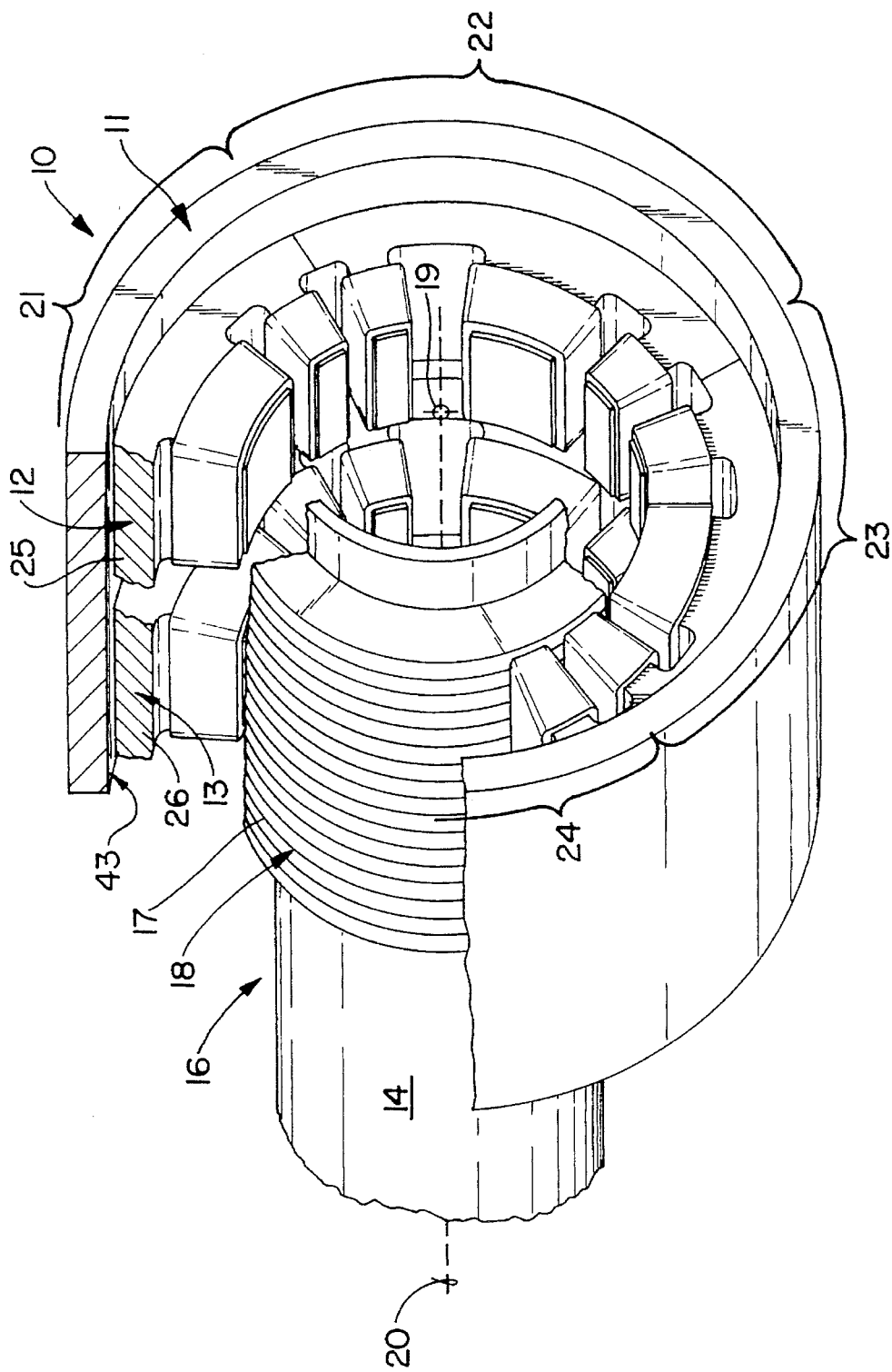
FIG. 1 is a cross-sectional view of the magnetic radial bearing of the present invention.

Referring to FIG. 1, the magnetic bearing 10 of the present invention is preferably a radial bearing and includes a generally cylindrical housing 11 formed from a non-magnetic material such as stainless steel within which two rings 12, 13 of stator sections are positioned. The bearing is shown in conjunction with a rotor assembly 16 which includes a shaft 14 and a rotor 17 having a radially outer circumferential surface 18 rotatable with the shaft 14. As those skilled in the art will readily appreciate, the center of rotation 19 of the rotor assembly 16 lies on the axis of rotation 20 of the rotor assembly 16, and at the center of rotation 19 the axis of rotation 20 is essentially parallel to the shaft 14 regardless of any shaft deflection occurring distant from the rotor assembly 16.

Figure 2:
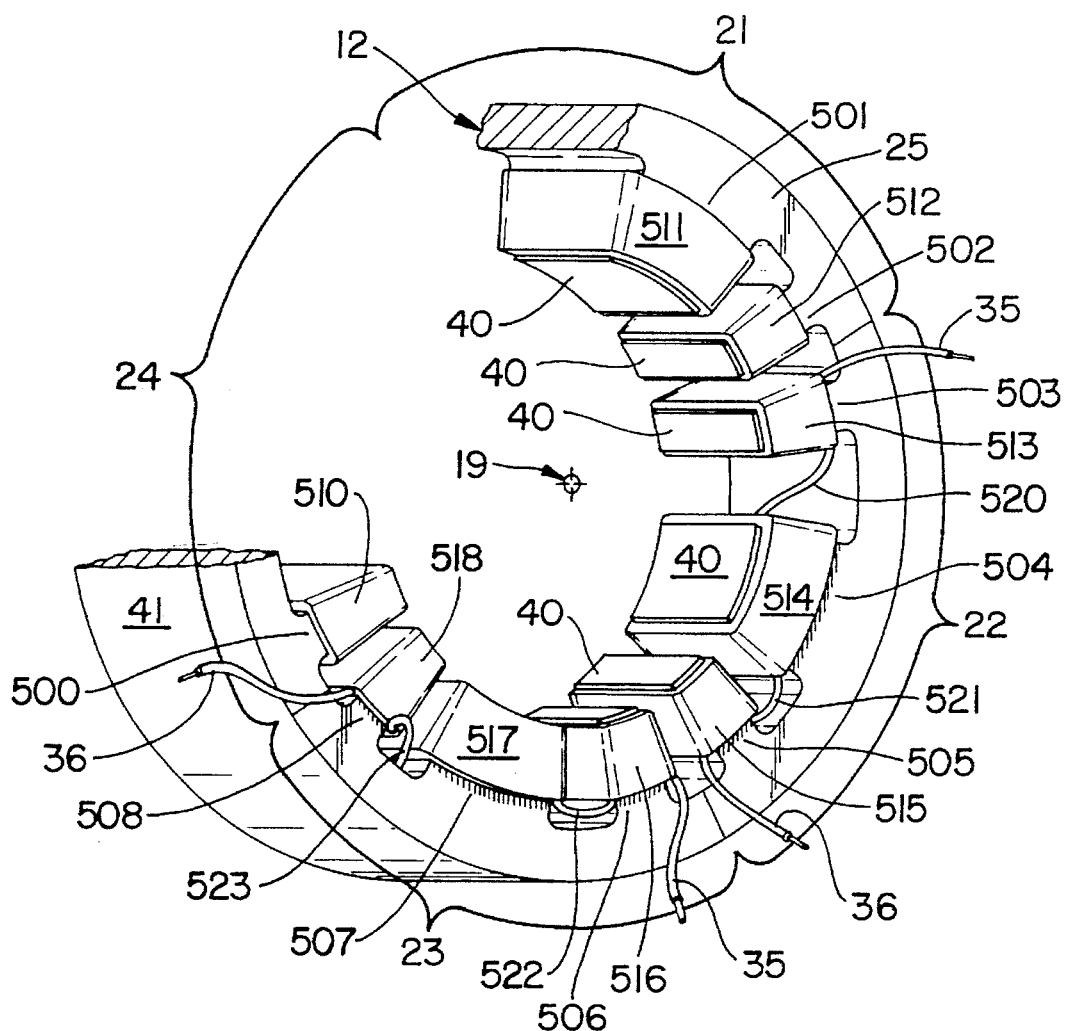
FIG. 2 is a cross-sectional view of the first stator ring of the magnetic radial bearing of FIG. 1.

Each stator ring 12, 13 comprises a plurality of stator sections 21, 22, 23, 24 arranged in series about the inner circumference of the housing 11. In the preferred embodiment, each stator ring has four substantially similar stator sections. Stator ring 12 is shown in FIG. 2 without the housing 11, rotor assembly 16, and portions of sections 21 and 24 for clarity, and although only the coils of sections 22 and 23 are fully shown, it is to be understood that the other stator sections 21, 24 are of the same construction.

The sections 21, 22, 23, 24 share a common core 12 which is the ring 12, but each section is electrically isolated from the other sections as described below. For purposes of clarity, ring 12 is shown and described, but it is to be understood that rings 12 and 13 are similar in construction. The core 12 is preferably made of a ferro-magnetic material, and includes a plurality of poles 500, 501, 502, 503, 504, 505, 506, 507, 508. Each pole 500, 501, 502, 503, 504, 505, 506, 507, 508 is encompassed by a magnetic energizing coil 510, 511, 512, 513, 514, 515, 516, 517, 518. Each coil 510, 511, 512, 513, 514, 515, 516, 517, 518 comprises multiple turns of a conductor arranged in multiple layers to supply the required magnetizing field. The coils of each section 21, 22, 23, 24 receive electrical current through conductors 35, 36 independent of the other sections, as shown in FIG. 2. However, within each section (see sections 22 and 23 as representative of each of the sections) the coils are interdependent for electrical current, since the coil associated with each pole receives electrical current in series with the other coils in the same section, as shown by the wires 520, 521, 522, 523. The coil of the center pole of each section is wound counter to the coils of adjacent poles in the same section. For example, if the coil 5 14 of the center pole of section 22 is wound in a clockwise direction as viewed from the center of rotation 19 of the rotor assembly, the adjacent coils 513, 514 must be wound in a counterclockwise direction as viewed from the center 19. As those skilled in the art will readily appreciate, such winding of the coils of each section results in the center pole having a polarity opposite that of the two adjacent poles of the same section when current is applied to the conductors 35, 36. For purposes of clarity, only conductors 35, 36 of sections 22 and 23 are shown in FIG. 2, but it is to be understood that each of the other sections in each ring 12, 13 has similar conductors, and the poles and coils of the other sections of each ring 12, 13 are similar.

Each pole of each stator section 21, 22, 23, 24 has an arcuate inner surface 40 and the stator ring 12, 13 has an arcuate outer surface 41 radially outward therefrom. Referring again to FIG. 2, the radially inner end of each pole 500, 501, 502, 503, 504, 505, 506, 507, 508 terminates at the inner arcuate surface 40 thereof, and each pole is in spaced relation to adjacent poles. Each pole 500, 501, 502, 503, 504, 505, 506, 507, 508 is oriented substantially perpendicular to the axis of rotation 20 of the shaft 14. The inner arcuate surfaces 40 of the poles of each stator ring 12, 13 define a radially inner circumferential surface interrupted by the spaces between the poles. In the preferred embodiment, each of the stator sections 21, 22, 23, 24 is generally pie-shaped, diverging radially from the radially inner circumferential surface. The arcuate outer surface 41 contacts the inner face 43 of the cylindrical housing 11 as shown in FIG. 1, thereby transferring the load of the shaft 14, which is supported by the rings 12, 13, to the cylindrical housing 11. The shaft 14 rotates within and is supported by the stator rings 12, 13 with the radial position of the shaft 14 being controlled by the magnetic flux generated by the coils and flowing through the poles located therein. The rotor assembly 16 is in spaced relation to the inner circumferential surface defined by the inner arcuate surfaces 40 of the stator rings 12, 13.

Figure 3:
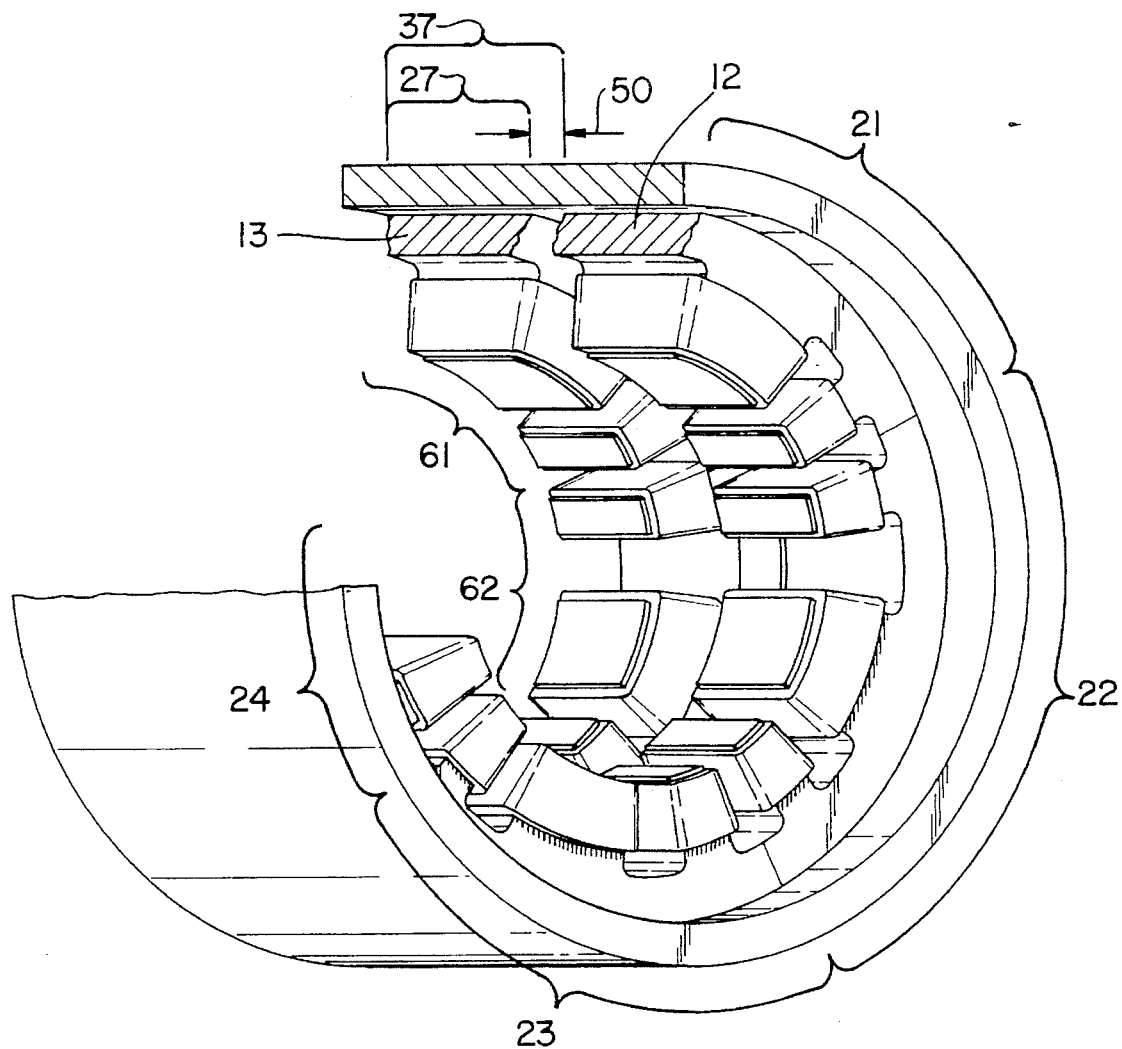
FIG. 3 is a cross-sectional view of the magnetic radial bearing of the present invention without the rotor assembly.
Figure 4:
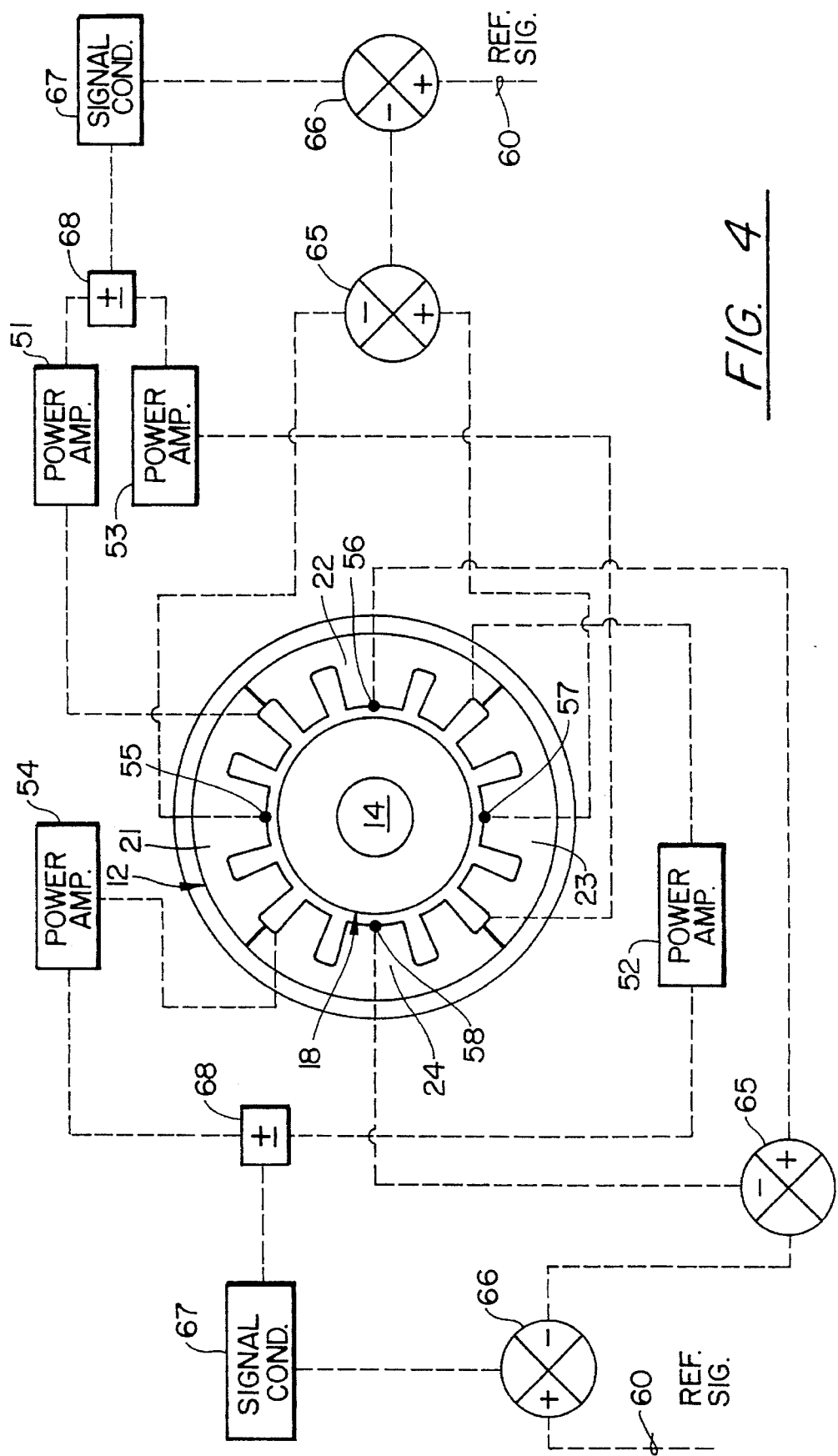
FIG. 4 is a schematic showing the position sensors and the system for generating and controlling the magnetic flux in the stator sections of the first ring of the radial bearing.
Figure 5:
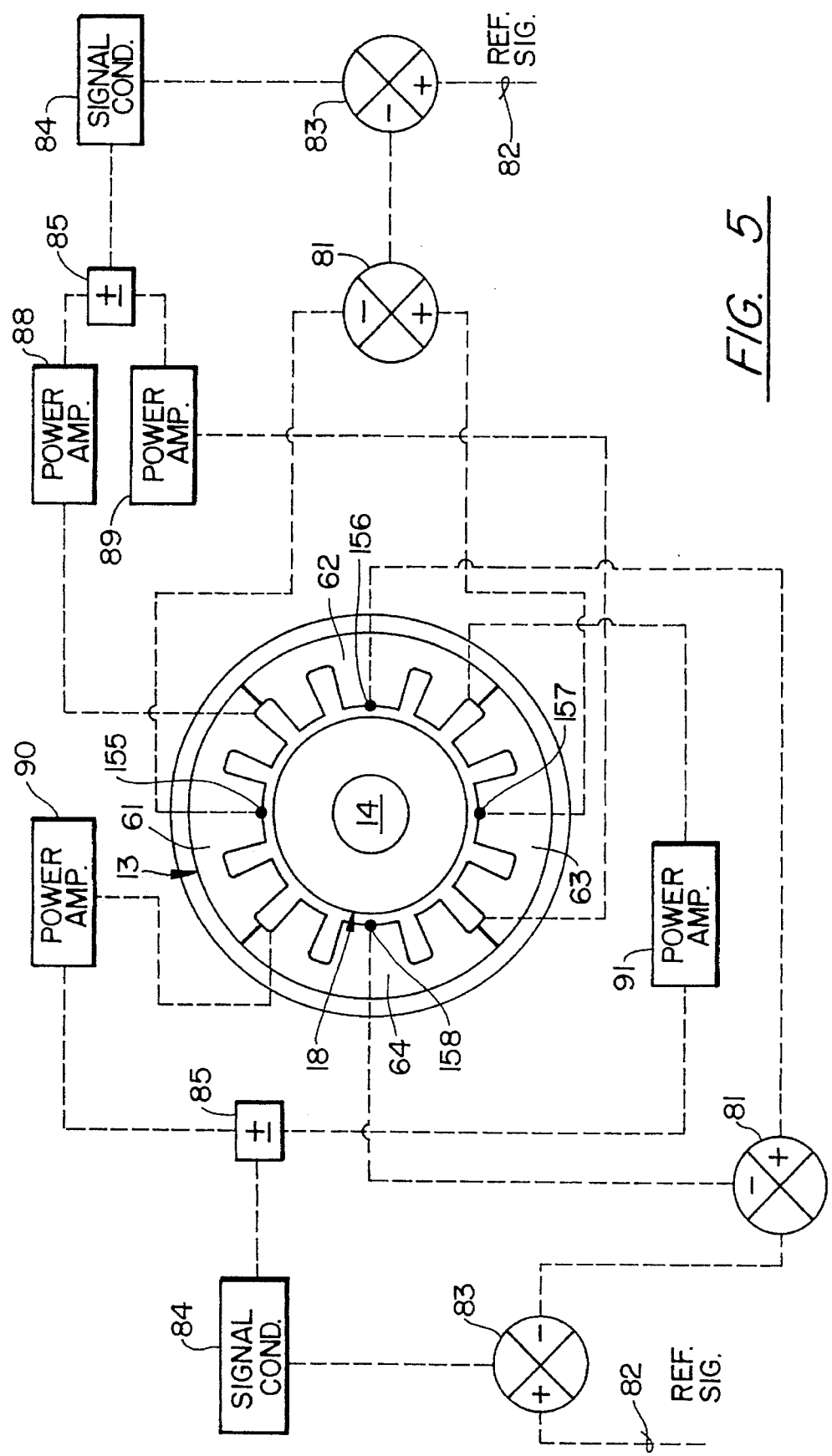
FIG. 5 is a schematic showing the position sensors and the system for generating and controlling the magnetic flux in the stator sections of the second ring of the radial bearing.

As shown in FIG. 3, the stator rings 12, 13 are spaced axially from one another along the shaft 14, and each of the stator sections 21, 22, 23, 24 of the first ring 12 has a corresponding stator section in the second ring 13 which is diametrically opposed and axially offset therefrom. As used herein, the term "diametrically opposed and axially offset" means that for a given stator section 23 in the first ring 12, there is a stator section 61 in the second ring 13 which occupies a position diametrically opposed to the first stator section 23 but shifted axially along the axis of rotation 20 a distance 37 equal to the axial width 27 of the second ring stator section 61 plus the space 50 between the rings. Referring to FIG. 4, each of the stator sections 25, 26, 27, 28 has a current supply and a power amplifier 51, 52, 53, 54 connected thereto for supplying and regulating the current supplied to the respective coil, thereby generating and adjusting the magnetic flux in the stator section 25, 26, 27, 28 independent of adjacent stator sections. Thus, the force exerted by each particular stator section on the opposing portion of the outer circumferential surface 18 of the rotor assembly immediately adjacent the particular stator section can be controlled independent of each of the other stator sections. The output of the power amplifiers 51, 52, 53, 54 is regulated by a respective control signal 60 to position the rotor assembly 16 and the shaft 14 within the ring 12. For the purpose of clarity in the following discussion, the stator sections of the first ring 12 are referred to as 21, 22, 23, and 24, while the stator sections of the second ring 13 are referred to as 61, 62, 63, and 64, as shown in FIG. 5. Note that stator section 23 is diametrically opposed to stator section 21, while stator section 61 is diametrically opposed and axially offset from stator section 21. In the embodiment shown, the coils in diametrically opposed stator sections of the first ring 12 are arranged to operate in a complementary fashion so that an increase in force in one section 21 is accompanied by a corresponding reduction in force in the diametrically opposed section 23. Likewise, the coils in diametrically opposed stator sections of the second ring 13 are arranged to operate in a complementary fashion similar to that of the first ring 12. The position of the rotor 17 relative to the desired axis of rotation 20 is monitored by primary position sensors 55, 56, 57, 58. The outputs of opposite pairs of sensors (e.g. 55, 57) are summed at summing junction 65 and compared to a reference signal 60, at comparator 66. The resulting signal is conditioned by signal conditioner 67 to compensate for non-linearities and the like and the conditioned signal applied to a signal distributor 68. The distributor 68 generates the control signals to respective power amps 51, 53, and ensures that complementary adjustment of the current supply to the coils is provided. It will be appreciated that similar signal processing is provided for position sensors 56, 58 to control the power amps 52, 54 of their respective stator sections 22, 24 (see FIG. 4). Referring to FIG. 5, the stator sections 61, 62, 63, 64 of the second ring 13, are similar to the stator sections 21, 22, 23, 24. Secondary position sensors 155, 156, 157, 158 are located axially offset from the primary position sensors 55, 56, 57, 58 and the outputs of opposite pairs of sensors (e.g. 155, 157) are summed at summing junction 81 and compared to a reference signal 82 at comparator 83. The resulting signal is conditioned by signal conditioner 84 to compensate for non-linearities and the like and the conditioned signal applied to a signal distributor 85. The distributor 85 generates the control signals to respective power amps 88, 89, and ensures that complementary adjustment of the current supply to the coils is provided. It will be appreciated that similar signal processing is provided for the position sensors 156, 158 to control their respective power amps 90, 91.

As those skilled in the art will readily appreciate, as long as identical current levels are supplied to corresponding stator sections of the first and second rings (i.e. 21 and 61, 22 and 62, 23 and 63, 24 and 64), the magnetic bearing of the present invention operates similar to the magnetic bearings of the prior art. However, since two stator rings 12, 13 are utilized in the present invention, the stator sections of each ring 12, 13 need only have an axial width approximately half that of the stator sections of the prior art, although the two stator rings 12, 13 are necessary to exert a level of force on the shaft 14 equal to the single stator rings of the prior art.

Of course, in the situation where an odd number of stator sections are provided, complementary adjustment of the coils will not be possible and the control logic will be implemented in a different manner to allow individual control of the coils in each stator section. Similarly, in some cases, the current supply to one sector is maintained at a nominal level and the current to the coil of an opposed stator section will be modulated. This arrangement is beneficial where the rotational axis 20 of the shaft 14 is in a horizontal orientation and the current to the coils of the lower stator sections is maintained at a nominal value. In some situations, the bearing 10 could be used to control movement along only one radial axis in which case only two sectors need be provided.

In operation, deviations of the rotor 17 from the desired rotational axis 20 are detected and the current supplied to the coils in the appropriate stator section is varied. By varying the current supplied to the coils, the magnetic flux may also be varied to maintain the position of the shaft 14 at a desired datum. So long as the shaft 14 remains parallel to the desired axis of rotation 20, the rotor 17 remains positioned symmetrically with respect to corresponding stator sections of the first and second rings 12, 13 (i.e., the gap between the rotor 17 and a stator section 21 of the first ring 12 is equal to the gap between the rotor 17 and the corresponding stator section 61 of the second ring 13). Accordingly, the output of each sensor in the first ring 12 is the same as the corresponding sensor in the second ring 13.

Figure 6:
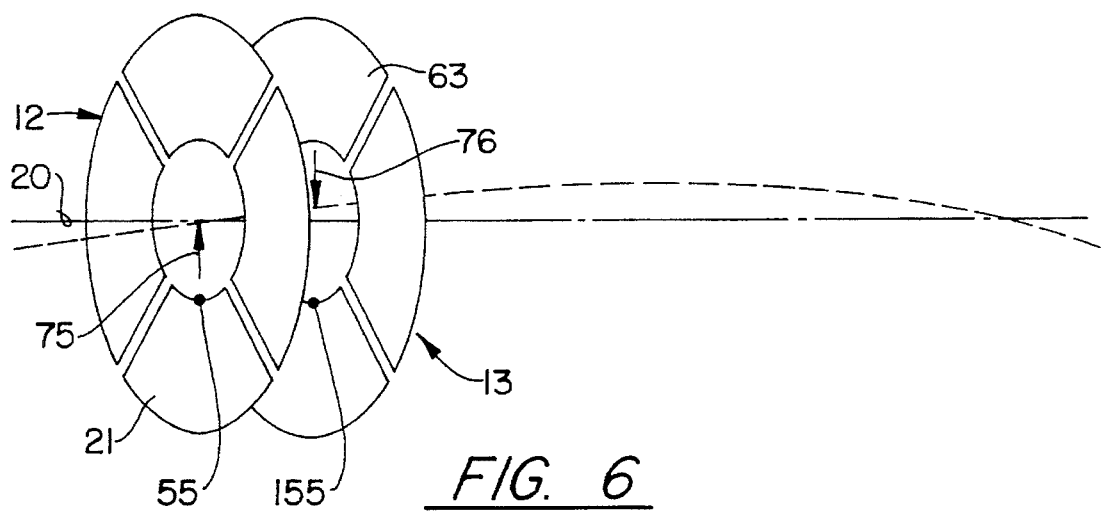
FIG. 6 is a schematic view of a shaft which has "bowed", showing the resulting force couple on the radial bearing assembly.

However, if the shaft 14 "bows", as shown schematically in FIG. 6, the output of at least one sensor 55 in the first ting 12 is different than the corresponding sensor 155 in the second ring 13. In response to this condition, the current to stator sections 21 and 63 is increased, and a stator section 21 of the first ring 12 exerts a force 75 on the rotor 17 which is equal in magnitude (but opposite in direction) to the force 76 exerted on the shaft 14 by the stator section 63 of the second ring 13 which is diametrically opposed to and axially offset from the first ring stator section 21. As those skilled in the art will readily appreciate, the resulting force couple 75, 76 imparts a moment to the shaft 14 which opposes the deflection, thereby tending to un-bow the shaft 14 and return it to the desired axis of rotation 20.

Figure 7:
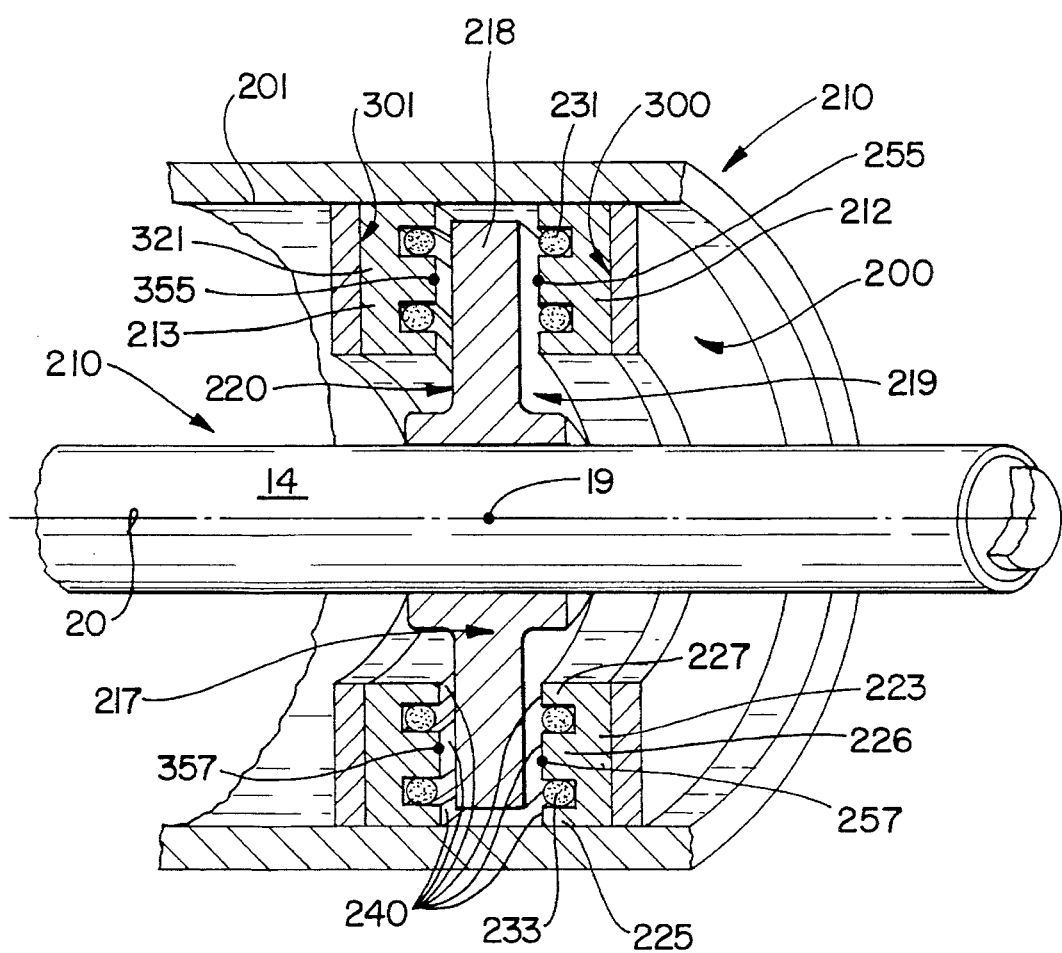
FIG. 7 is a cross-sectional view of the magnetic thrust bearing embodiment of the present invention.
Figure 8:
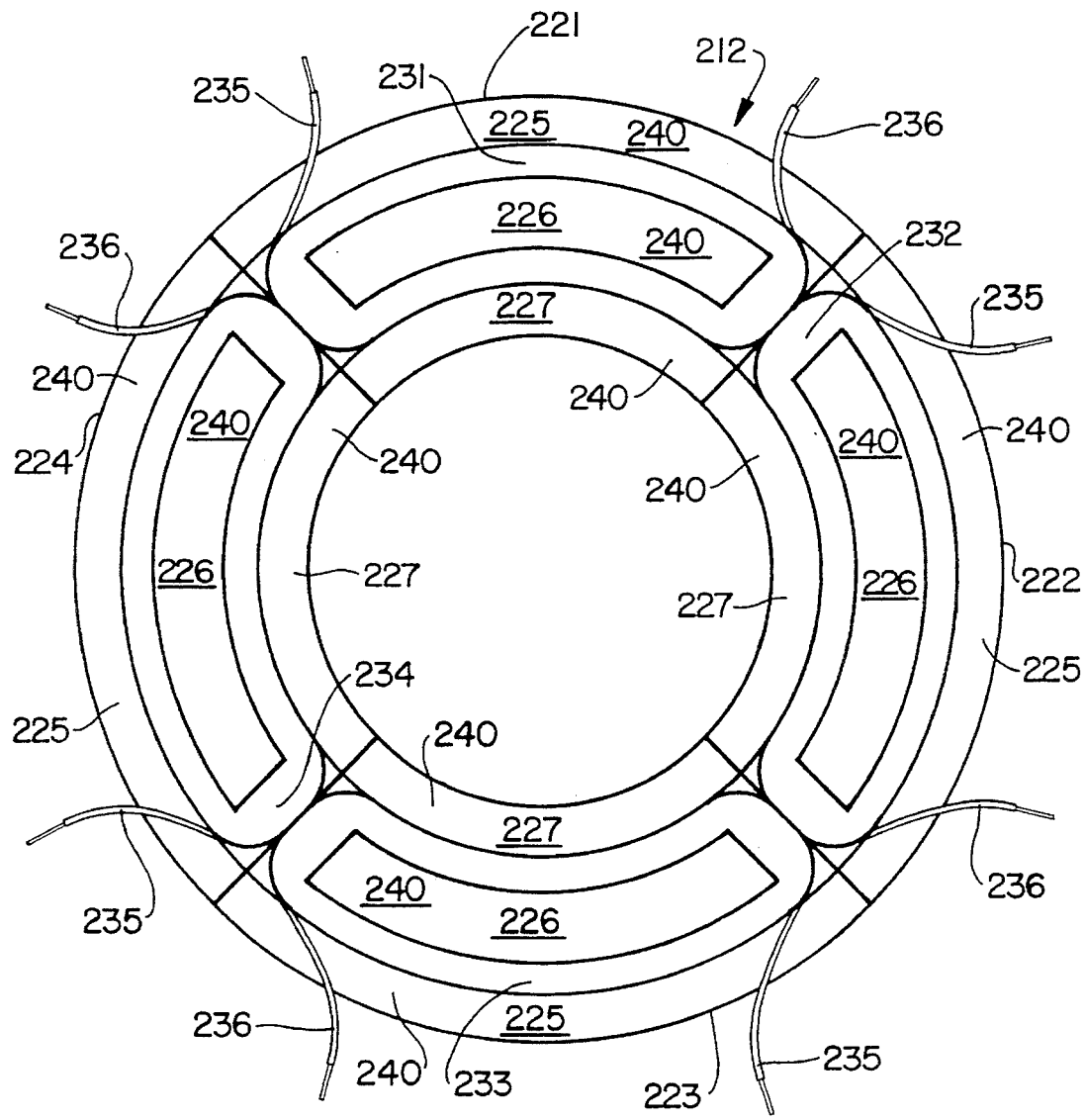
FIG. 8 is a cross-sectional view of the first stator ring of the magnetic thrust bearing of FIG. 7.
Figure 9:
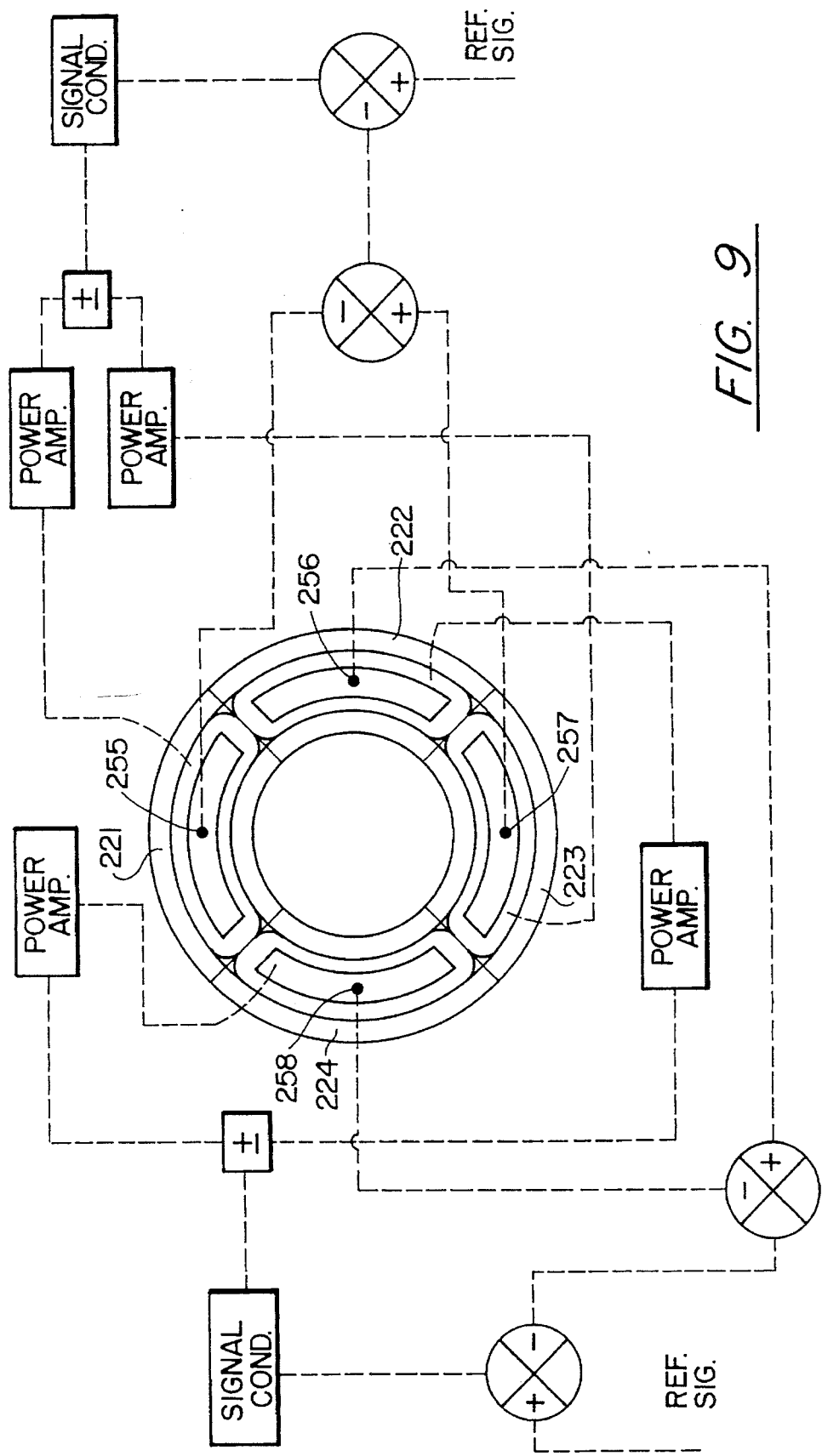
FIG. 9 is a schematic showing the position sensors and the system for generating and controlling the magnetic flux in the stator sections of the first ring of the thrust bearing.

An alternate embodiment of the present invention is shown in FIG. 7 incorporated into a thrust bearing 210. The thrust beating includes two generally disk shaped housings 200, 201 formed from a non-magnetic material such as stainless steel. Each disk shaped housing 200, 201 has a circular channel 300, 301 in one face thereof, and the circular channel 300 of the first disk shaped housing 200 is opposed to, and axially spaced from the circular channel 301 of the second disk shaped housing 201. Each circular channel 300, 301 has a ring 212, 213 of stator sections positioned thereon. Although the following discussion is directed toward stator ring 212, it is to be understood that the construction of stator ring 213 is the same. As shown in FIG. 8, stator ring 212 comprises a plurality of stator sections arranged in series within the circular channel 300. Preferably, each stator ring is made up of four substantially similar stator sections 221, 222, 223, 224. Each stator section incldues a core aligned parallel to the axis of rotation 20, preferably made of a ferro-magnetic material, and the core 225, 226, 227, 228 is encompassed by a magnetic energizing coil 231, 232, 233, 234. Each coil comprises multiple turns of a conductor arranged in multiple layers to supply the required magnetizing field. The coil associated with each stator section receives electrical current through conductors 235,236 associated therewith. Because the coil is located within each stator section, only the core in that sector is influenced by that coil. Each stator section has an arcuate face 240 which faces the thrust rotor 217. One end of the core 225, 226, 227, 228 terminates at the inner arcuate face 240, thus defining a pole of the core 225, 226, 227, 228, and each pole is in spaced relation to the pole of adjacent stator sections 221, 222, 223, 224. Each of the stator sections 221, 222, 223, 224 is generally the shape of a cylindrical shell having a substantially constant axial cross-section. Each stator section 221, 222, 223, 224 rests in the circular channel 300 thereby transferring the axial load of the shaft 14, which is supported by the thrust bearing 210, to the cylindrical housing 200. The four stator sections 221, 222, 223, 224 which comprise each stator ring 212, 213 provide an inner circumferential face interrupted by the spaces between the poles in which the coils are located. The thrust rotor 210 and shaft 14 therein rotate within and are supported axially by the stator rings 212, 213 with the axial position of the shaft 14 being controlled for the first ring 12 by the magnetic flux flowing through the cores 225, 226, 227, 228 and generated by the coils 231, 232, 233, 234. Referring to FIG. 7, the thrust rotor assembly 210 is axially spaced from the circumferential face 240 of each thrust stator ring 212, 213, and comprises a rotor 217 having a disk 218 having opposed forward 219 and aft 220 surfaces rotatable with the shaft 14. As described above, the center of rotation 19 of the thrust rotor assembly 210 lies on the axis of rotation 20 of the thrust rotor assembly 210, and at the center of rotation 19 the axis of rotation 20 is essentially parallel to the shaft 14 regardless of any shaft deflection occurring distant from the thrust rotor assembly 210. The thrust stator rings 212, 213 are spaced axially from one another along the shaft 14, and each of the stator sections 221, 222, 223, 224 of the first thrust ring 212 has a corresponding stator section in the second thrust ring 213 which is diametrically opposed and axially offset therefrom, as in the case of the radial bearing 10. Each of the thrust stator sections has a current supply and a power amplifier connected thereto in a manner similar to the stator sections of the radial bearing 10, for supplying and regulating the current supplied to the respective coil, thereby generating and adjusting the magnetic flux in the thrust stator section independent of adjacent thrust stator sections. Thus, the force exerted by each particular thrust stator section 221, 222, 223, 224 on the opposing portion of the thrust rotor 217 immediately adjacent the particular thrust stator section can be controlled independent of each of the other thrust stator sections. Each of the thrust stator sections in the first and second thrust stator rings 212, 213 has a position sensor 255, 256, 257, 258 therein as shown in FIG. 9. Referring back to FIG. 7, sensors 355 and 357 in the second thrust ring 213 correspond to sensors 255 and 257, respectively, in the first thrust ring 212. The sensors in the second thrust ring 213 which correspond to sensors 256 and 258 of the first ring are not shown, but it is to be understood that the thrust stator sections of the second thrust ring 213 which correspond to thrust shator sections 256 and 258 also have sensors therein.) The control of the coil for each shator section of each thrust ring 212, 213 is the same as discussed above in connection with the radial thrust bearing assembly. Since two adjacent thrust shator rings 212, 213 are utilized in the present invention, the thrust shator sections of each ring 212,213 need only have an axial width approximately half that of the thrust shator sections of the prior art, although two thrust shator rings are necessary to exert a level of force on the shaft equal to that of the prior art.

In operation, deviations of the thrust rotor 217 from the desired axial datum are detected and the current supplied to the coil in the appropriate thrust shator sections is varied. By varying the current supplied to the coils, the magnetic flux may also be varied to maintain the position of the shaft 14 at a desired datum. So long as the shaft 14 remains parallel to the desired axis of rotation 20, the thrust rotor disk 218 remains in a plane parallel with the inner faces 240 of each of the thrust shator rings 212, 213. Accordingly, the output of each sensor in the first ring 212 is the same, and the output of each of the sensors in the second ring 213 is the same. However, if the shaft "bows", in the manner shown in FIG. 7, the output of at least some sensors in the first ring is different than the one or more of the other sensors in the same ring as those skilled in the art will readily appreciate. In response, a thrust shator section 223 of the first ring 212 exerts a force on the rotor 217 which is equal in magnitude (but opposite in direction) to the force exerted on the rotor 217 by the thrust stator section 321 of the second ring 213 which is diametrically opposed to and axially offset from the first ring thrust shator section 223. As those skilled in the art will readily appreciate, the resulting force couple imparts a moment to the shaft 14 which opposes the deflection, thereby tending to un-bow the shaft and return it to the desired axis of rotation.

Although the invention has been shown and described in connection to a gas turbine engine, it will be appreciated by those skilled in the art that the invention is applicable to any large machinery where shaft deflection is a problem.

We claim:

1. A magnetic bearing apparatus comprising:

a rotor assembly secured to and rotating with rotating components of said bearing apparatus defining a center of rotation, an axis of rotation, and a plane of rotation of said rotor assembly;

a stator assembly secured to stationary components of said bearing, said rotor and stator assemblies having opposed surfaces separated by a gap, said stator assembly including a plurality of first stator sections arranged serially about the axis of rotation of said rotor assembly, and a plurality of second stator sections arranged serially about the axis of rotation, said second stator sections spaced axially from said first stator sections, each of said first and second stator sections having associated therewith means for generating and adjusting the magnetic flux in the stator section independent of the adjacent stator sections and thereby adjusting the force exerted by each particular stator section on a portion of the opposed surface of the rotor assembly immediately adjacent said particular stator section; and, means for producing a bending moment about the center of rotation of the rotor assembly, said bending moment acting perpendicular to the plane of rotation of the rotor assembly said means for producing a bending moment comprising a controller, said controller simultaneously controlling said means for generating and adjusting the magnetic flux in the one of the first stator sections and said means for generating and adjusting the magnetic flux in the second stator section diametrically opposed and radially offset therefrom, the first stator magnetic flux being equal and opposite to the second stator magnetic flux.

2. The magnetic bearing of claim 1 wherein each stator has a ferromagnetic core, and each core is oriented perpendicular to said axis of rotation.

3. The magnetic bearing of claim 2 wherein each of said generation and adjustment means includes coil means and electric current supply means, said coil means encompassing at least a portion of each core in each respective stator section.

4. The magnetic bearing of claim 3 wherein the controller regulates the electrical current thereby providing at a first magnitude current one of the first stator sections and current at a second magnitude to the second stator section diametrically opposed and radially offset therefrom said first magnitude equal to said second magnitude.

* * * * *

UNITED STATES PATENT AND TRADEMARK OFFICE
CERTIFICATE OF CORRECTION

PATENT NO. : 5,455,472
DATED : October 3, 1995
INVENTOR(S) : Carl F. Weiss et al It is certified that error appears in the above-indentified patent and that said Letters Patent is hereby corrected as shown below:

```
In column 1, at line 7, replace "beating" with --bearing--.
In column 4, at line 41, replace "tings" with --rings--.
In column 5, at line 6, replace "ting" with --ring--.
In column 5, at line 22, replace "beating" with --bearing--.
In column 6, at line 34, replace "shator" with --stator--.
In column 6, at line 35, replace "shator" with --stator--.
In column 6, at line 38, replace "shator" with --stator--.
In column 6, at line 39, replace "shator" with --stator--.
In column 6, at line 41, replace "shator" with --stator--.
In column 6, at line 42, replace "shator" with --stator--.
In column 6, at line 47, replace "shator" with --stator--.
In column 6, at line 53, replace "shator" with --stator--.
In column 6, at line 60, replace "shator" with --stator--.
In column 6, at line 65, replace "shator" with --stator--.
In column 8, at line 24, replace "current one" with --current to one--.
```

Signed and Sealed this

Twelfth Day of March, 1996

Attest:

BRUCE LEHMAN

Attesting Officer

Commissioner of Patents and Trademarks